Feb. 13, 1923. 1,445,457.
P. SIMON.
COOKING UTENSIL.
FILED FEB. 9, 1922.

Inventor
P. Simon
By F. K. Bryant.
Attorney

Patented Feb. 13, 1923.

1,445,457

UNITED STATES PATENT OFFICE.

PETER SIMON, OF BINGHAMTON, NEW YORK.

COOKING UTENSIL.

REISSUED

Application filed February 9, 1922. Serial No. 535,330.

*To all whom it may concern:*

Be it known that I, PETER SIMON, a citizen of Czecho-Slovakia, residing at Binghamton, in the county of Boone and State of New York, have invented certain new and useful Improvements in Cooking Utensils, of which the following is a specification.

This invention relates to certain new and useful improvements in cooking utensils and has particular reference to a cooking vessel embodying inner and outer containers, the wall of the inner vessel in the container be provided with a plurality of perforations to permit of a free circulation of fluid from one container to another.

The primary object of the invention resides in the provision of a cooking vessel embodying inner and outer containers with devices for holding the container in spaced relation, the inner container being provided with a plurality of perforations, while cooperating devices carried by the two containers permit the inner container to be supported in an elevated position within the outer container and also removing the contents thereof without the necessity of entirely removing the inner container from the outer container.

With the above general objects in view and others that will appear as the nature of the invention is better understood, the same consists of the novel form, combination and arrangement of parts hereinafter more fully described, shown in the accompanying drawing and claimed.

In the drawing, wherein like reference characters designate corresponding parts throughout the several views, Figure 1 is a vertical cross sectional view of a cooking utensil constructed in accordance with the present invention showing the inner container having supporting feet resting upon the bottom wall of the outer container, Figure 2 is a cross sectional view similar to Fig. 1 showing the inner container raised to its elevated position and supported by cooperating devices carried by the two containers.

Figure 1:
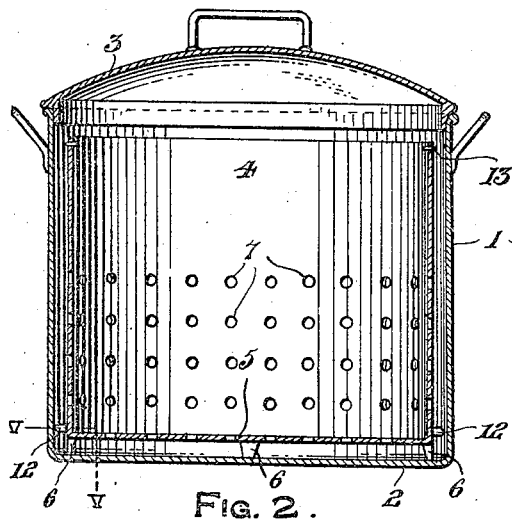

Referring more in detail to the accompanying drawing there is illustrated a cooking utensil embodying a container having a cylindrical side wall 1 and bottom wall 2 with a cover 3 removably mounted thereon. An inner container embodying a cylindrical side wall 4 and a bottom wall 5 is disposed within the outer container 1 and retained in spaced relation by the supporting feet 6 carried by the bottom of the container. As illustrated the side and bottom walls of the inner container are provided with a plurality of perforations 7 to permit the free circulation of fluid from the outer receptacle to the inner receptacle.

Figure 3:
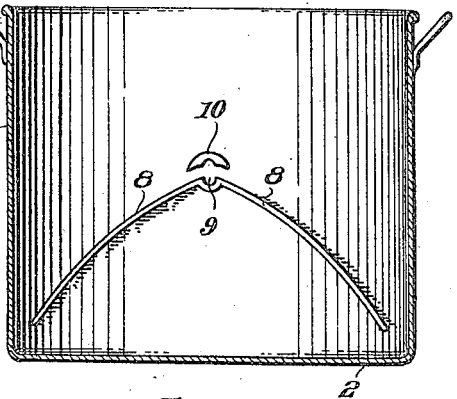
Figure 3 is a cross sectional view of the outer container showing the upwardly converging rack carried by the side wall thereof for supporting the inner container in an elevated position.
Figure 2:
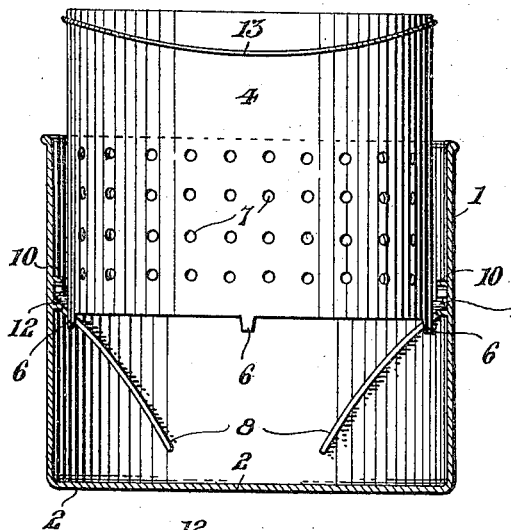
Figure 4:
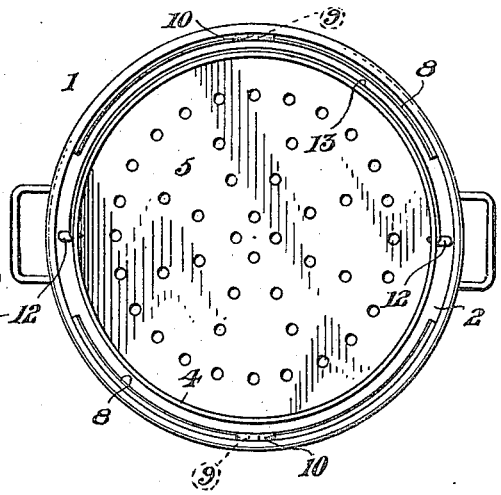
Figure 4 is a top plan view of the utensil with the cover of the outer container removed.
Figure 5:
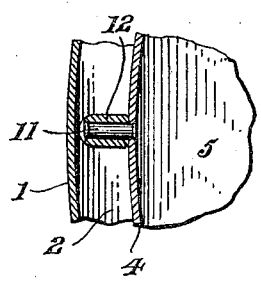
Figure 5 is a detail sectional view showing the supporting pins carried by the inner container for engaging the racks carried by the outer container.

Means is provided for holding the inner receptacle in an elevated position, the same comprising a pair of oppositely disposed upwardly converging racks, each embodying a pair of inclined arcuate racks 8 having at the meeting point or apex thereof a socket 9, a stud or guard projection 10 carried by the inner wall of the outer container 1 overlying the socket 9, the racks 8 being diametrically secured to the inner faces of the outer container 1 as clearly shown in Figs. 2 and 3. As shown in Fig. 5, a pin 11 projects laterally of the inner container 4 adjacent the lower end thereof, the pin carrying a rotatable collar 12 for riding upon the upwardly converging rack 8 for the purpose of reducing friction between the relatively moving parts.

With the inner container 4 in the position shown in Fig. 1, the cover 3 of the outer container is removed and the handle or bale carried by the inner container is grasped to slightly elevate the inner container and position the pins 11 diametrically carried by the inner container for engagement with its associated rack 8. Continued rotation of the inner container 4 will cause the pins to ride upon the upwardly converging racks 8 until the same reach the apex of the inclined racks while the guards or lugs 10 prevent accidental disengagement or removal of the inner receptacle from the outer receptacle when the same is supported in an elevated position. It will be understood that when the inner container is resting upon the bottom wall of the outer container, a slight elevating movement thereof and rotation in either direction will cause the pins to ride upon the adjacent sides of the racks 8 to bring the inner container to an elevated position, this arrangement eliminating the necessity of vertically lifting the inner container when the same is heavily laden, and rotation of the inner container greatly facilitates the elevating movement thereof. The inner container may be readily removed from the outer receptacle 1 by disposing the pins 11 laterally of the guard lugs 10 or otherwise. The utensil is adapted for various uses, such as cooking or washing clothes, the same being employed where it is desired to space the contents of the inner container from the wall of the outer container, the perforations in the inner container providing for the free circulation of fluid. When the device is used as a cooking utensil the inner container may be raised to its elevated position and water contained therein permitted to drain through the perforations, while clothing to be washed placed in the inner container will be permitted to drain off excess water when the inner container is elevated.

While there is herein shown and described the preferred embodiment of the present invention, it is nevertheless to be understood that minor changes may be made therein without departing from the spirit and scope thereof.

What is claimed as new is:—

1. In a vessel of the type described, inner and outer containers, the inner container having a plurality of perforations over the side and bottom walls thereof, upwardly converging racks diametrically secured to the inner wall of the container, and laterally projecting pins carried by the inner container adapted to ride upon said racks during the elevation of the inner container, the apices of the racks having depressions therein for supporting the pins upon the inner container to maintain the latter in an elevated position.

2. In a vessel of the type described, inner and outer container, the inner container having a plurality of perforations over the side and bottom walls thereof, upwardly converging racks diametrically secured to the inner wall of the container, laterally projecting pins carried by the inner container adapted to ride upon said racks during the elevation of the inner container, the apices of the racks having depressions therein for supporting the pins upon the inner container, to maintain the latter in an elevated position, and guard lugs carried by the face of the outer container overlying the depressions to prevent removal of the inner container from the outer container.

3. In a cooking utensil of the type described, inner and outer containers, cooperating devices carried by the adjacent faces of the containers adapted to cause the elevation of the inner container when the inner container is rotated, said cooperating devices including upwardly converging racks carried by the inner face of the outer container, and pins laterally projecting from the inner container.

4. In a cooking utensil of the type described, inner and outer containers, cooperating devices carried by the adjacent faces of the containers adapted to cause the elevation of the inner container when the inner container is rotated, said cooperating devices including upwardly converging racks carried by the inner face of the outer container, each of said racks having a socket in the upper end thereof to receive the pins carried by the inner container to hold the latter in an elevated position.

In testimony whereof I affix my signature.

PETER SIMON.